INVENTOR
Walter Ruf

Dec. 27, 1966 W. RUF 3,294,187
MECHANICAL DRIVE FOR TRACKED VEHICLES
Filed Jan. 17, 1964 5 Sheets-Sheet 2

INVENTOR
Walter Ruf

BY *Stevens, Davis, Miller & Mosher*
ATTORNEYS

United States Patent Office 3,294,187
Patented Dec. 27, 1966

3,294,187
MECHANICAL DRIVE FOR TRACKED VEHICLES
Walter Ruf, Landhaus am See, Bottighofen,
Thurgau, Switzerland
Filed Jan. 17, 1964, Ser. No. 338,387
Claims priority, application Germany, May 9, 1963,
R 35,146; May 30, 1963, R 35,298
16 Claims. (Cl. 180—6.66)

The present invention relates to a mechanical drive for tracked vehicles and more particularly for tanks, in which the engine drives through a clutch a stepped transmission unit, and this stepped transmission unit drives in turn the chain drive wheels through a steering gear unit.

There are already known steering gear units for tracked vehicles connected in series to a stepped transmission unit in such a manner as to make possible a differential drive of both chain drive wheels when traveling along curves. If the continued travel of the tracked vehicle under its own power is no longer possible, either due to damage to the vehicle, engine failure, or other causes, there are experienced certain difficulties in towing the vehicle, because the steering is impaired or wholly unusuable. For normal traveling on the road, comparatively short tow-rods can be used. In this case, the towed vehicle will substantially follow the track of the towing vehicle. However, when traveling over open ground, it may in some cases be of greater advantage to use longer tow ropes, enabling the towing vehicle to select a more favourable towing position. If, for example, the vehicle to be towed has slid down a steep slope, the towing vehicle may not be able to follow, and the above-mentioned tow-rods cannot be used. Obviously, towing can be much better adapted to the difficult conditions encountered in the open field if the towed vehicle can be towed by means of a long tow rope and if it can be steered during the towing.

In known drives of this kind, the stepped transmission gearing contains one or two forward gears. It has now been shown that in extreme cases, for example, when the vehicle is used as towing vehicle, or with the sudden appearance of superior enemy forces, such as strong anti-tank forces, it may be convenient to have at one's disposal as many reverse gears as there are forward gears. In the former case, the vehicle may operate in all gears whilst observing at the same time the towed vehicle. In the second case, the vehicle can disengage itself from the enemy without first having to carry out a time-wasting turning maneuver.

Moreover, the known mechanical drives for chain drive wheels make possible traveling along curves generally only by stopping one of the chains for short periods, resulting in a jerky movement when traveling along curves. It would be of much greater advantage to provide a center position for the steering unit for traveling along curves, in which the two chain drive wheels are driven at a certain speed ratio of, say, 1:2 or 1:3.

It is therefore a principal object of the invention to provide an improved mechanical drive for tracked vehicles and for tanks, whereby the maneuvering and handling of the vehicle is facilitated.

It is another object of the invention to design the mechanical drive in such a way as to provide a towing position in which the shafts of the chain drive wheels are interconnected but disengaged from the stepped transmission unit, wherein the vehicle remains steerable by means of the conventional brakes.

It is another object of the invention to provide a mechanical drive wherein the hitherto used reverse gears in the stepped transmission unit may be omitted and the vehicle may be operated in reverse in all gears available for the forward travel.

It is another object of the invention to provide a mechanical drive for tracked vehicles and tanks, so constructed that its operation offers all the advantages hitherto offered only by expensive and complex hydraulic units so as to make this drive suitable particularly for lighter tanks and for reconnaissance vehicles, wherein, owing to the purely mechanical construction of the drive the repair thereof is considerably facilitated in the case of damage, for example, due to enemy fire.

It is another object of the invention to provide a mechanical drive for tracked vehicles and tanks, comprising, between each chain drive wheel and the steering gear unit, a differential with braking and coupling means, whereby the traveling characteristics of the vehicle in curves are considerably improved.

Preferably, the steering gear unit is equipped with a reverse gear whereby during the traveling of the vehicle in the reverse the chain drive wheels may be driven at all forward speeds of the stepped transmission unit.

A particularly preferred embodiment comprises four gear wheels in coaxial arrangement; these gear wheels can be coupled in pairs by means of clutch sleeves, wherein one of the said gear wheels is connected with one chain drive wheel, the second gear wheel with the second chain drive wheel, the third gear wheel with the stepped transmission unit in one sense of rotation and the fourth gear wheel with the stepped transmission unit in the opposite sense of rotation.

Conveniently, the two innermost gear wheels are connected with the chain drive wheels. With the transmission in the towing position, one of the two clutch sleeves interconnects these two gear wheels, whilst the other clutch sleeve rests inoperatively on one of the outer gear wheels. Preferably, the two outermost gear wheels can each be connected with a bevel gear; these two bevel gears are driven by a further bevel gear the shaft of which is connected with the stepped transmission unit.

Other objects, advantages and uses of the invention will become apparent from the following description, given by way of example with reference to the accompanying drawings, in which.

Figure 1:
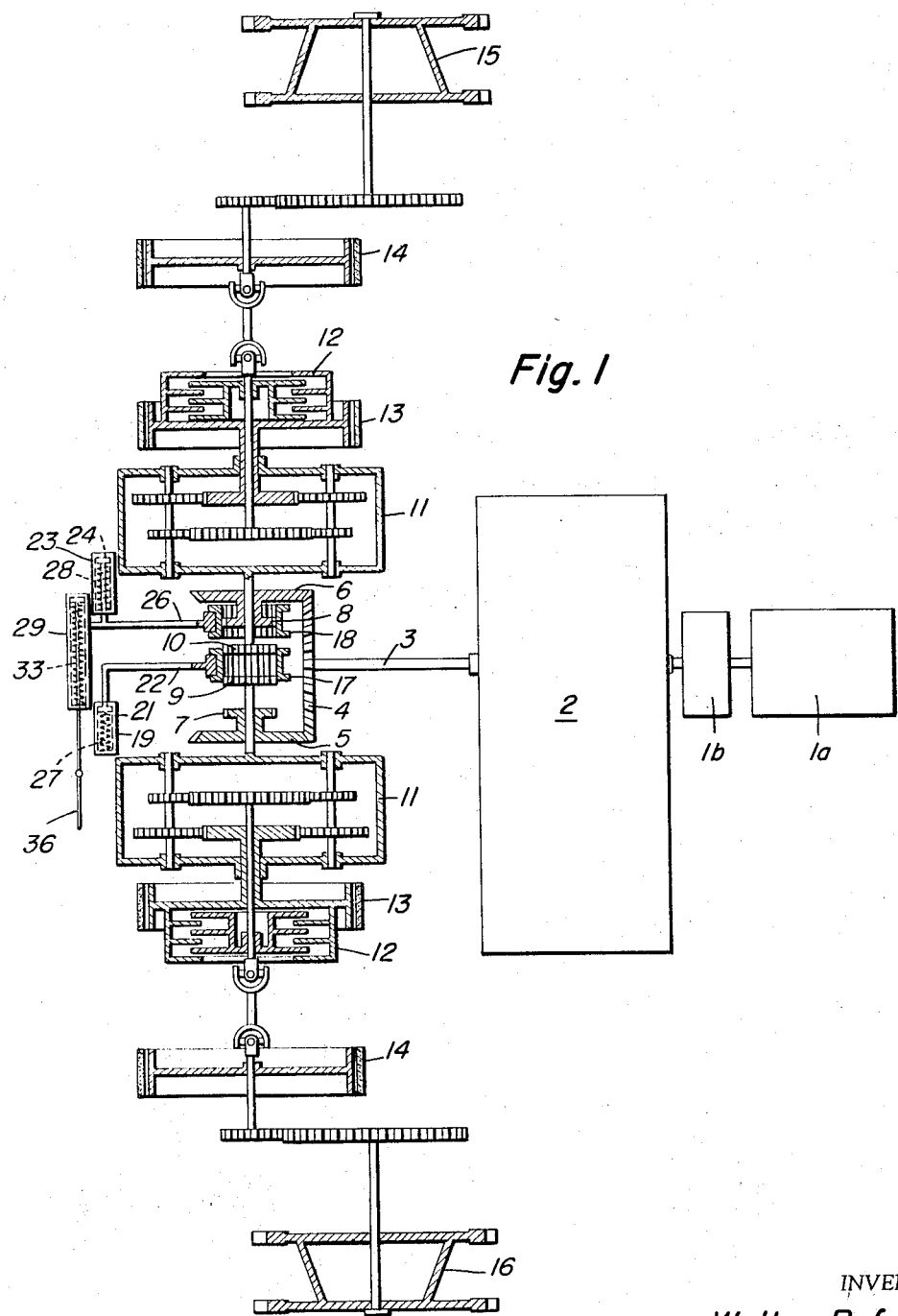
FIG. 1 is a diagrammatic view of the entire steering gear unit.
Figure 2:
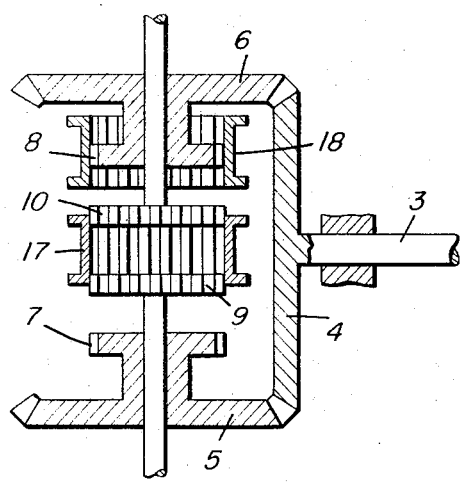
FIG. 2 shows diagrammatically the steering gear unit in the towing position of the vehicle.
Figure 6:
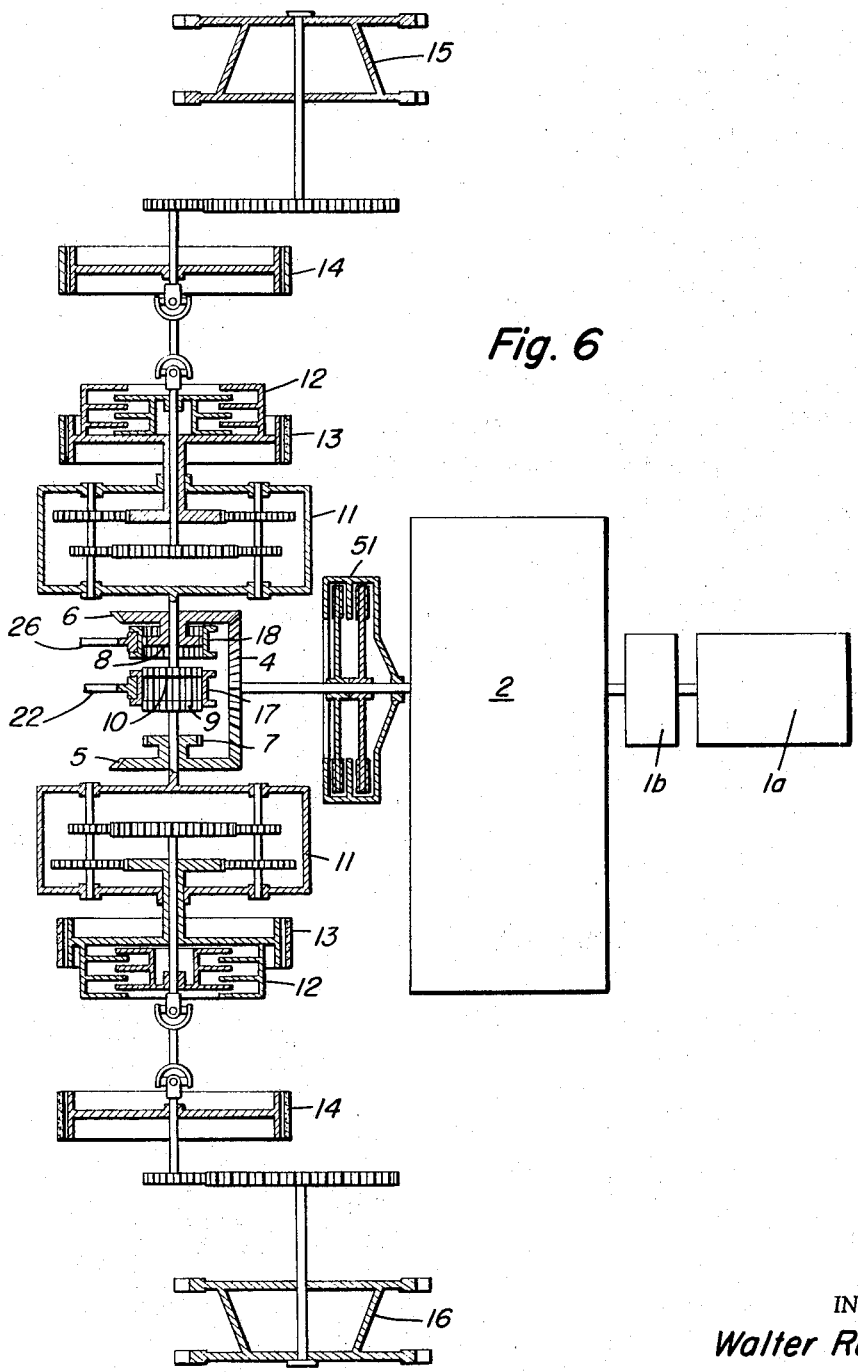
FIG. 6 is a diagrammatic view similar to that in FIG. 1 and shows another embodiment.

An engine 1a of the tracked vehicle drives through a clutch 1b a stepped transmission unit 2, equipped only with forward gears but not with reverse gears. The engine 1a, the clutch 1b and the stepped transmission unit 2 are indicated in FIGS. 1 and 6 only diagrammatically as boxes, since these units are of conventional construction and generally known in the art.

The stepped transmission unit 2 has a driven shaft 3 which drives a bevel gear 4 of the steering gear. This bevel gear 4 mates with coaxially mounted and oppositely rotating bevel gears 5 and 6 which are rigidly connected with gear wheels 7 and 8. Two further gear wheels 9 and 10, each connected with a planetary gear system 11, are mounted between the said gears 7 and 8. Each planetary gearing 11 drives a chain drive wheel and 16, respectively through a clutch 12 with associated brake and through a further brake 14. By actuating the brakes 13 and 14, curves with any desired radius of curvature may be traveled through up to the complete stopping of one chain.

The gear wheels 7, 8, 9 and 10 can be coupled in pairs by means of adjustable clutch sleeves 17 and 18. The clutch sleeve 17 is operated by means of a pneumatic cylinder 19, containing a piston 21 which actuates the clutch sleeve 17 by means of a lever 22. The clutch sleeve 18 is operated by a pneumatic cylinder 23 with a piston 24; this piston 24 is connected with the clutch sleeve 18 through a lever 26. The pneumatic cylinders 19 and 23 have springs 27 and 28 respectively, which urge the clutch sleeves 17 and 18 into the position shown in FIGS. 1, 2, 6 and 7.

This position corresponds to the above-mentioned, new towing position of the steering gear unit. In this position, the clutch sleeve 18 rests inoperatively on the gear 8. The gears 9 and 10 are interconnected by the clutch sleeve 17. Thus, the two chain drive wheels 15 and 16 are interconnected through the steering gear unit, but disconnected from the stepped transmission unit 2. The vehicle is fully capable of being steered by means of the brakes 13 and 14.

Figure 3:
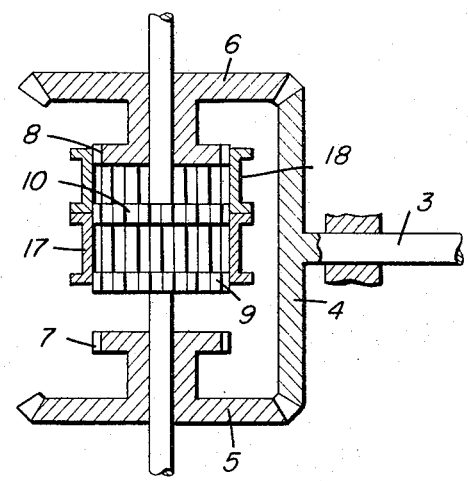
FIG. 3 shows diagrammatically the steering gear unit in the forward drive position of the vehicle.

By operating the pneumatic cylinder 23, the clutch sleeve 18 may be so displaced through the lever 26 that it interconnects the two gears 8 and 10, as indicated in FIG. 3. This position corresponds to the forward travel, that is to say, the driven shaft 3 of the stepped transmission 2 drives through the bevel gears 4 and 6 in the same sense, the gear wheel 8, the clutch sleeve 18, the gear wheels 9 and 10.

Figure 5:
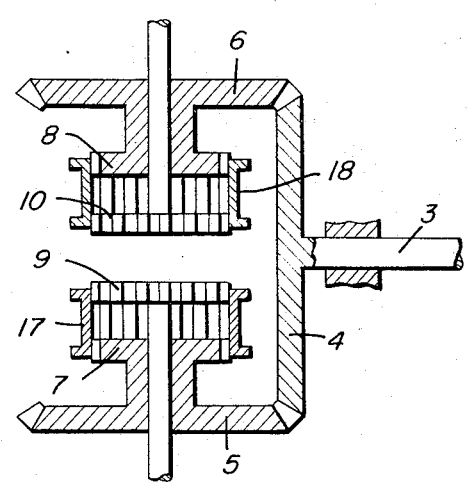
FIG. 5 shows diagrammatically the steering gear unit position for "turning on the spot by driving the chains in opposite directions"

Subsequent operation of the pneumatic cylinder 19 causes the position according to FIG. 5 to be assumed, in which the clutch sleeve 17 interconnects the gear wheels 7 and 9. Then the two gears 9 and 10 are driven in the opposite sense of rotation corresponding to the oppositely directed rotation of the two bevel gears 5 and 6. Thus, also the two chain drive wheels 15 and 16 are driven in the opposite sense, and the vehicle turns on the spot.

Figure 4:
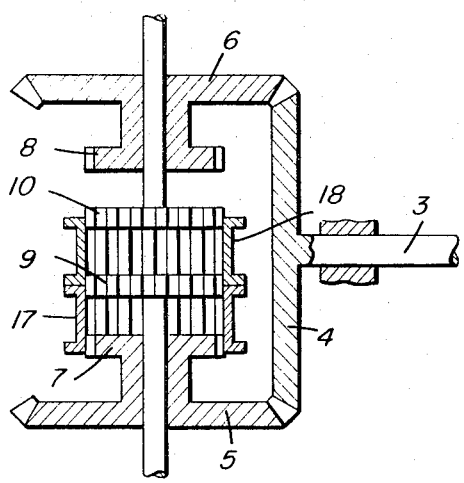
FIG. 4 shows diagrammatically the steering gear unit in the reverse drive position of the vehicle.

By operating the pneumatic cylinder 23 further, the clutch sleeve 18 may be moved into a position in which it connects the two gears 9 and 10 while the clutch sleeve 17 connects the two gears 7 and 9. This position, which is shown in FIG. 4, corresponds to reverse travel, that is to say, both chain drive wheels are driven in the same direction but in the sense opposite to that represented in FIG. 3. This position has the special advantage that all forward gears of the transmission unit 2 are available for reversing. Thus, the vehicle is capable of disengaging itself quickly from the enemy without having to turn. In addition, by using low forward gears in reverse, very steep obstacles can be overcome.

In the case of a failure of the compressed air supply, the two clutch sleeves 18 and 17 return, as outlined above, under the action of the springs 27 and 28 into the towing position shown in FIGS. 1, 2, 6 and 7. In order to enable the steering gear unit to be operated in spite of a compressed air failure, there is provided a cylinder 29 containing a spring 33. By actuating a linkage system 36 or a Bowden cable, the clutch sleeve 18 may be moved manually into the forward travel position shown in FIG. 3. The continued movement of the linkage system 36 causes the clutch sleeve 18 to entrain the other clutch sleeve 17 so that both clutch sleeves are thereby moved into the reverse travel position shown in FIG. 4. When the linkage system 36 is released, the clutch sleeves 17 and 18 return under the action of the springs 23 and 27 into the towing position shown in FIGS. 1, 2, 6 and 7.

Figure 7:
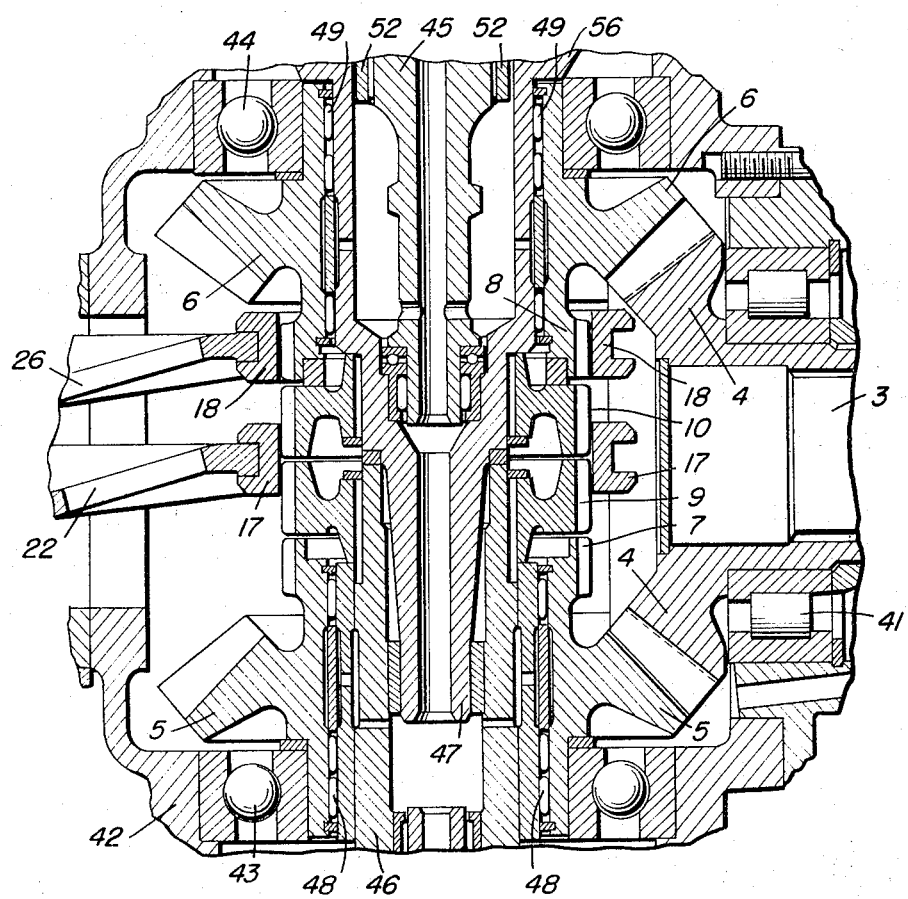
FIG. 7 shows a sectionalized view of a part of the steering gear unit.

FIG. 7 shows a special embodiment of one part of the steering gear unit. The shaft 3 is here rotatably mounted in needle bearings 41 in a housing 42 for the steering gear. The bevel gears 5 and 6 rest on the housing 42 by means of ball bearings 43 and 44. The shafts 45 and 46 leading to the planetary gear systems 11 are centered one in the other by means of a cone 47, but can otherwise freely rotate relative to one another. The gear wheel 9 is keyed on to the shaft 46 and the gear wheel 10 on to the shaft 45. The shaft 46 is mounted in the bevel gear 5 and the shaft 45 in the bevel gear 6 by means of needle bearings 48 and 49, respectively.

The embodiment shown in FIG. 6 is adapted to be used for modifying vehicles in which the steering gear unit can be so arranged that the two shafts 45 and 26 can be interconnected, but the shaft 3 cannot be disengaged from the transmission unit 2. In this case, a clutch 51 is fitted between the transmission unit 2 and the shaft 3 in order to make possible the towing position mentioned above with all its advantages.

Figure 8:
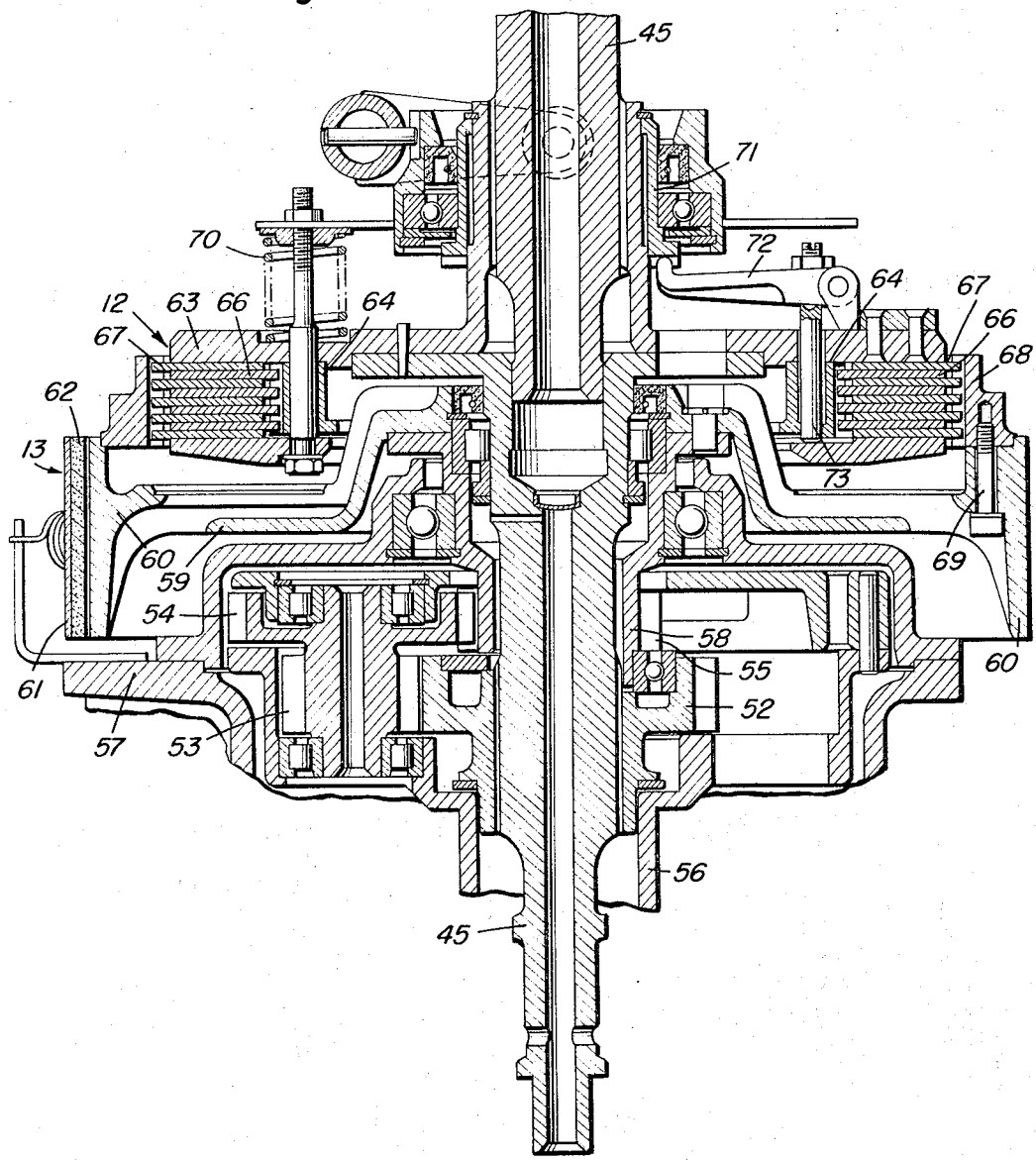
FIG. 8 is a cross-section of another part of the steering gear unit.

The two planetary systems 11, each of which represents a reduction gearing and the brake 13 are identical and are shown in detail in FIG. 8. The shaft 45 carries a non-rotatably mounted main sun gear 52. This sun gear 52 mates with a first planetary gear 53, connected integrally with a second planetary gear 54. This planetary gear 54 mates with an auxiliary sun gear 55. The planetary gears 53 and 54 are driven by the associated gear wheels 9 and 10, respectively, through a web 56, firmly connected with a housing 57 of the planetary gearing. The auxiliary sun gear 55 is connected with a sleeve 58. The sleeve 58 is mounted on a housing cover 59, connected with a brake ring 60 so that the brake ring 60 rotates together with the sleeve 58. Opposite this brake ring 60 there are brake jaws 61, carrying brake linings 62. The ports 60, 61 and 62 form the brake, shown diagrammatically at 13 in FIGS. 1 and 6.

The clutch, shown generally at 12, is connected by a clutch plate 63 with the shaft 45 and with the main sun gear 52 keyed to this shaft. The said shaft 45 drives in turn the associated chain drive wheel 15 or 16. The clutch plate 63 is connected through webs 64 and through an internal toothing 65 with disks 66 equipped with internal toothing. Between the disks 66, there are mating disks 67 with external toothing, connected to the brake ring 60 through a gear ring 68 and a pin 69. The said plates 66 and 67 are pressed together by a spring 70. The clutch 12 is released by a sliding sleeve 71, axially displaceable on the shaft 45, a lever, 72, and a thrust pin 73.

The operation of the planetary gear system shown, acting as reduction gearing, is as follows:

For traveling along a straight path, that is to say, with both brakes 13 open or released, the sun gears 52 and 55 of both planetary gearing systems 11 rotate synchronously with the gear wheels 9 and 10. Also the planetary gears 53 and 54 revolve about the axis of the sun gears 53 and 55 at the same speed as the gear wheels 9 and 10, respectively, so that they do not carry out any rotation about their own axis of rotation. Accordingly, also the brake ring 60 and the clutch rings 67 rotate synchronously with the gear wheels 9 and 10.

For traveling along a curve, first the clutch 12 is operated. This may be effected by means of a steering member of conventional construction, such as, for example, a control column, not shown. Continued operation of the control column beyond the release of the clutch 12 actuates the brake 13, causing the brake lining 62 to be pressed against the brake ring 60. The auxiliary sun gear 55 is retarded relative to the general rotational movement. The planetary gears 53 and 54 start to rotate. When the brake 13 is blocked, the auxilliary sun gear 55 is stopped. The main sun gear 52 and the shaft 45 rotate therefore at different speeds, the difference of which corresponds to the reduction ratio of the planetary gearing system 11, causing the vehicle to travel along a predetermined curve. This radius of curvature may be reduced by operating the brake 14 associated with the inner chain drive wheel. When the brake 14 is blocked, the associated chain drive wheel 15 is stopped.

If tanks equipped with known mechanical steering gear units are damaged, they can be towed away only by means of a tow-bar, owing to the fact that they cannot be steered. Accordingly, the recovery vehicle must be brought into the close vicinity of the damaged tank. This may present serious drawbacks in unfavourable terrain, e.g., if the tank has stopped on a steep slope or in a fold. The mechanical drive according to the invention makes possible the use of tow ropes of any length. The towed vehicle may be steered by muscular effort, namely by manually operating the brakes 13 and 14. Any mechanical forces for the steering such as required, for example, by hydraulic units, is eliminated, and this is of special advantage in the case of engine failures.

The gears 7 through 10 of the steering gear unit can also be replaced by other coupling members adapted to produce a positive connection, such as, for example, members with pin connectors, and the clutch sleeves 17 and 18 may be adapted to the special design of the coupling members.

Having thus fully disclosed my invention, what I claim and desire to protect by Letters Patent is:

1. A mechanical drive for track vehicles having at least two tracks comprising a vehicle engine, a clutch means driven by said vehicle engine, a stepped transmission unit driven by said clutch, steering gear means, a steering gear means input shaft which is driven by said stepped transmission unit, two planetary gear means, two steering gear output shafts which connect the steering gear means with the planetary gear means respectively, a coupling member on each of the steering gear output shafts, connecting means disposed in the steering gear and displaceable between different positions, said connecting means selectively connecting the coupling members of the steering gear output shafts together in one of the different positions and disengaging said coupling members from the steering input shaft, track drive wheels, means for connecting each track drive wheel with one of the planetary gear means including clutch means and brake means for stopping the rotation of each of the track drive wheels independently of the rotation of the other track drive wheel, means in said steering gear for driving the track drive wheels in opposite directions.

2. A mechanical drive device according to claim 1 in which a first bevel gear is arranged on the shaft connecting the stepped transmission unit with the steering gear means and forms the input to the steering gear means, two other bevel gears being mounted in said steering gear means in engagement with said first bevel gear, the axes of said other bevel gears forming a right angle with the axis of the first bevel gear.

3. A mechanical drive device according to claim 2 in which each of the two other bevel gears are connected with a cylindrical extension which is provided with a coaxial spur gear forming an outer spur gear.

4. A mechanical drive device according to claim 3 in which two inner spur gears are coaxially mounted between the two outer spur gears capable of rotating with respect to the latter, the two output shafts of the steering gear being connected to said inner spur gears.

5. A mechanical drive device according to claim 4 in which the outer and inner spur gears are arranged concentrically to each other and have the same diameter and tooth geometry.

6. A mechanical device according to claim 5 in which two internally toothed shift sleeves are displaceably and selectively positioned on the two inner and the two outer spur gears, said internal teeth being brought into engagement with the external teeth of the spur gears whereby pairs of the adjacent spur gears can be connected to each other.

7. A mechanical device according to claim 6 in which, in a forward travel gear position, one shift sleeve connects the two inner spur gears with each other and the other shift sleeve connects one of the two inner spur gears with one of the two outer spur gears so that the two inner spur gears rotate in the same direction.

8. A mechanical drive device according to claim 6 in which, in a rearward travel gear position, one shift sleeve connects the two inner spur gears together and the other shift sleeve connects one of the two inner spur gears with the outer spur gear which is opposite the outer spur gear which is driven in the case of forward travel so that the two inner spur gears rotate in the same direction, but opposite to the direction of rotation for forward travel.

9. A mechanical drive device according to claim 6 in which, in a turn-on-the-spot gear position, the two shift sleeves connect adjacent outer and inner spur gears respectively, with each other so that the two inner spur gears rotate in opposite directions.

10. A mechanical drive device according to claim 6 in which, in a towing gear position, one of the shift sleeves is in engagement only with one of the two outer spur gears and the other shift sleeve connects the two inner spur gears together so that the two track drive wheels are coupled only with each other so that the vehicle is fully steerable upon selective actuation of the brake means.

11. A mechanical drive device according to claim 1 in which a clutch is operatively connected between the stepped gearing and the steering gear means.

12. A mechanical drive device according to claim 1 in which said means connecting each planetary gear means to said track drive wheel comprises a clutch having associated therewith a first brake means and a second independent brake means.

13. A mechanical drive device according to claim 4 in which each said planetary gear means comprises a main and an auxiliary sun wheel and a plurality of planetary wheels, said main sun wheel being operatively connected with the inner spur gears, said auxiliary sun wheel being rotatably supported with respect to the main sun wheel and operatively connected to said track drive wheel, said planetary wheels operatively connecting the main sun wheel and the auxiliary sun wheel respectively.

14. A mechanical drive device for tracked vehicles having at least two tracks comprising a vehicle engine, a clutch driven by said vehicle engine, a stepped transmission unit driven by said clutch, steering gear means, a steering gear means input shaft driven by said stepped transmission unit, two planetary gear means, two steering gear output shafts which connects the steering gear means with the planetary gear means respectively, four coaxially arranged coupling members in said steering gear, two of said coupling members being output coupling members and being positively connected with the steering output shafts respectively, the other two of said coupling members being input coupling members and being driven in opposite directions by said steering gear input shaft, connecting means coaxially arranged with said coupling members and axially displaceable into different positions, whereby in a first position one of the input coupling members is connected with both output coupling members for driving them in the same direction, in a second position the other of the input coupling members is connected with both output coupling members for driving them in the opposite direction compared with the first position, and in a third position one of the output coupling members is connected with one of the input coupling members and the other output coupling member is connected with the other input coupling member for driving the output coupling members in opposite directions and in a fourth position both of the output coupling members are connected with each other and are disengaged from the input coupling members, track drive wheels, means for connecting each said track drive wheel with one of the planetary gear means including clutch means and brake means for stopping the rotation of each of the track drive wheels independently of the other track drive wheel.

15. A mechanical drive as claimed in claim 14 wherein said coupling members are gear wheels.

16. A mechanical drive as claimed in claim 14 wherein said connecting members are two clutch sleeves which are actuated by a pressure medium.

References Cited by the Examiner

UNITED STATES PATENTS

| 1,620,668 | 3/1927 | Lipps | 180—6.66 X |
| 2,088,110 | 7/1937 | Lamb | 74—720.5 |
| 2,781,858 | 2/1957 | Kelly et al. | 180—6.7 |
| 2,918,830 | 12/1959 | O'Leary | 74—720.5 |

FOREIGN PATENTS 272,736  4/1951  Switzerland.

BENJAMIN HERSH, *Primary Examiner.*

J. A. PEKAR, *Assistant Examiner.*